United States Patent
Mc Nulty et al.

(10) Patent No.: US 7,145,265 B2
(45) Date of Patent: Dec. 5, 2006

(54) AC/DC HYBRID POWER SYSTEM

(75) Inventors: Thomas C Mc Nulty, Ewing, NJ (US); Anand Rangarajan, Berkeley Heights, NJ (US)

(73) Assignee: World Water & Powew Corporation, Pennington, NJ (US)

( * ) Notice: Subject to any disclaimer, the term of this patent is extended or adjusted under 35 U.S.C. 154(b) by 456 days.

(21) Appl. No.: 10/704,241

(22) Filed: Nov. 6, 2003

(65) Prior Publication Data
US 2004/0095091 A1 May 20, 2004

Related U.S. Application Data

(60) Provisional application No. 60/424,678, filed on Nov. 8, 2002.

(51) Int. Cl.
*H02J 3/02* (2006.01)
*H02J 9/00* (2006.01)

(52) U.S. Cl. .................. 307/44; 307/22; 307/26; 307/64

(58) Field of Classification Search ............ 307/44
See application file for complete search history.

(56) References Cited

U.S. PATENT DOCUMENTS

| | | | | |
|---|---|---|---|---|
| 5,254,929 A | * | 10/1993 | Yang ............................ | 320/103 |
| 5,493,155 A | * | 2/1996 | Okamoto et al. ............. | 307/45 |
| 5,698,908 A | * | 12/1997 | Pollmeier et al. ............ | 307/44 |
| 5,808,847 A | * | 9/1998 | Ferrazzi ...................... | 361/93.9 |
| 6,525,505 B1 | * | 2/2003 | Bay et al. .................... | 318/778 |
| 6,583,523 B1 | * | 6/2003 | Bhate .......................... | 307/86 |
| 6,879,060 B1 | * | 4/2005 | Hohri .......................... | 307/64 |

* cited by examiner

*Primary Examiner*—Robert L. Deberadinis
*Assistant Examiner*—Hal I. Kaplan

(57) ABSTRACT

A hybrid power system has two voltage sources, a variable DC power source, and a second power source, connected through selection components to a common node. The variable DC power source may be a solar power source and the second source may be an AC grid. The selection components, e.g. blocking diodes, SCRs, or relays, allow one or both of the sources to be connected to the node depending on the voltages produced by the sources. A variable speed drive and load may be connected to the node.

16 Claims, 3 Drawing Sheets

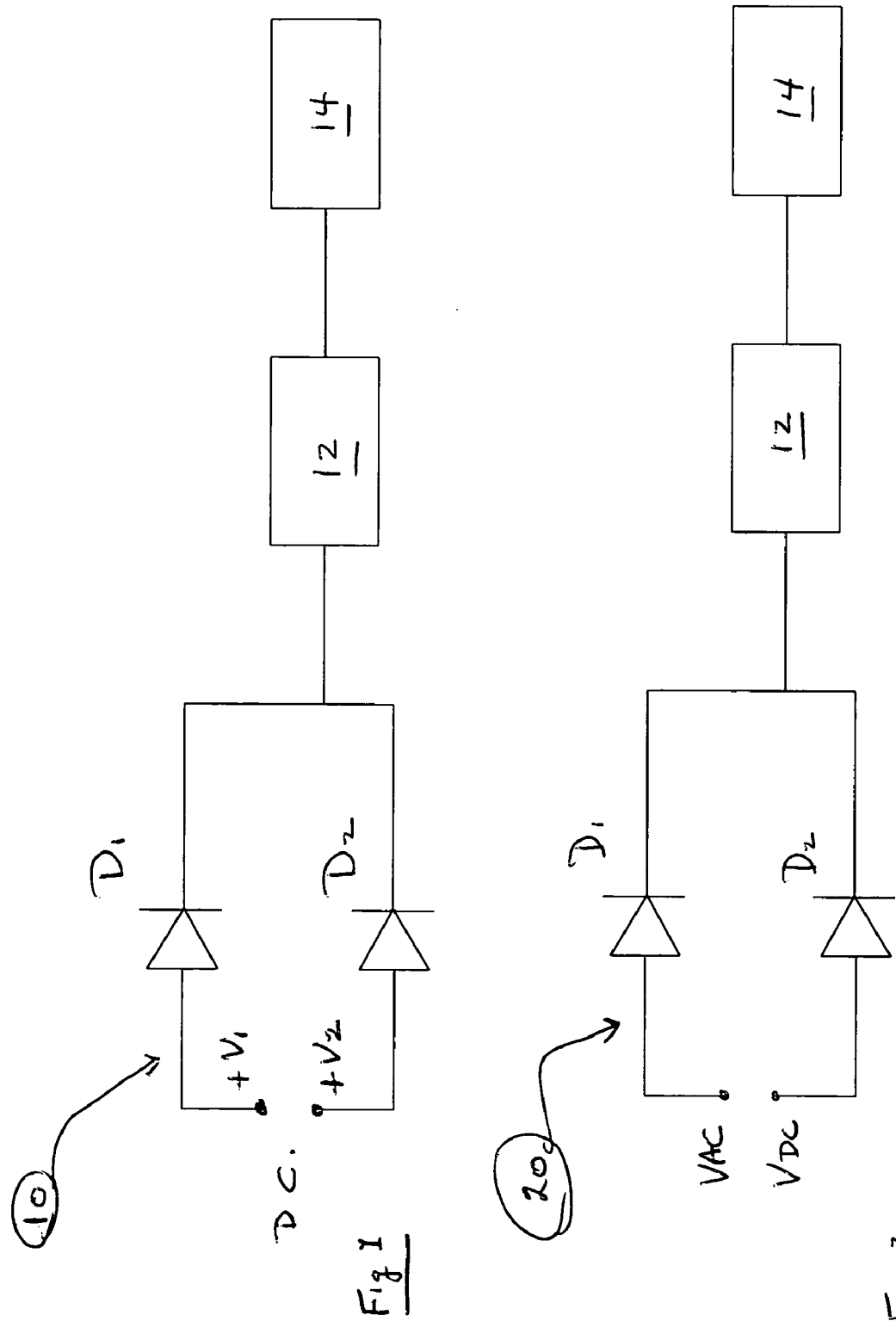

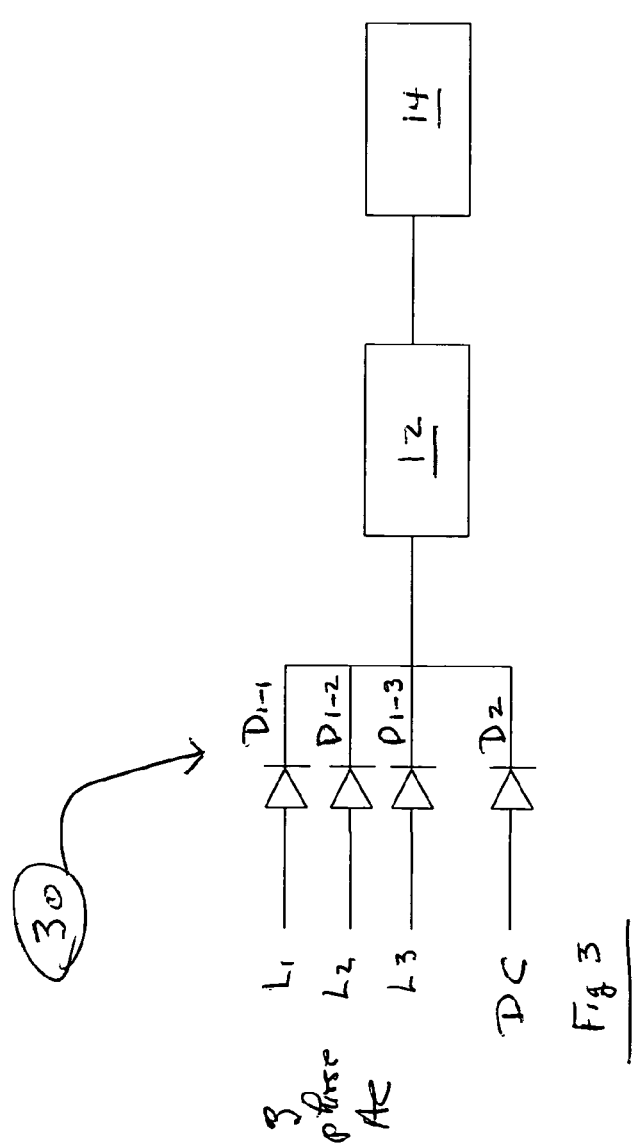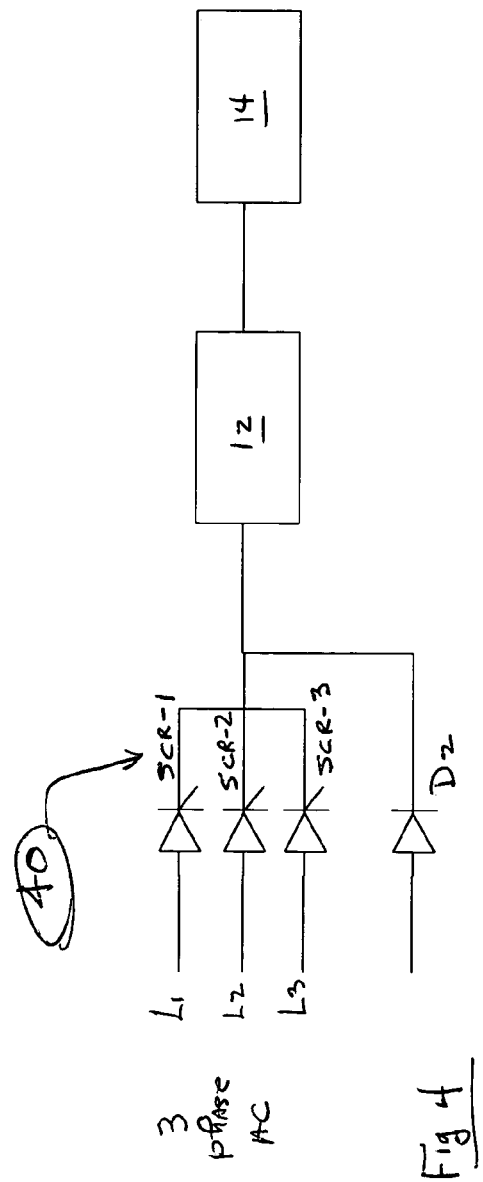

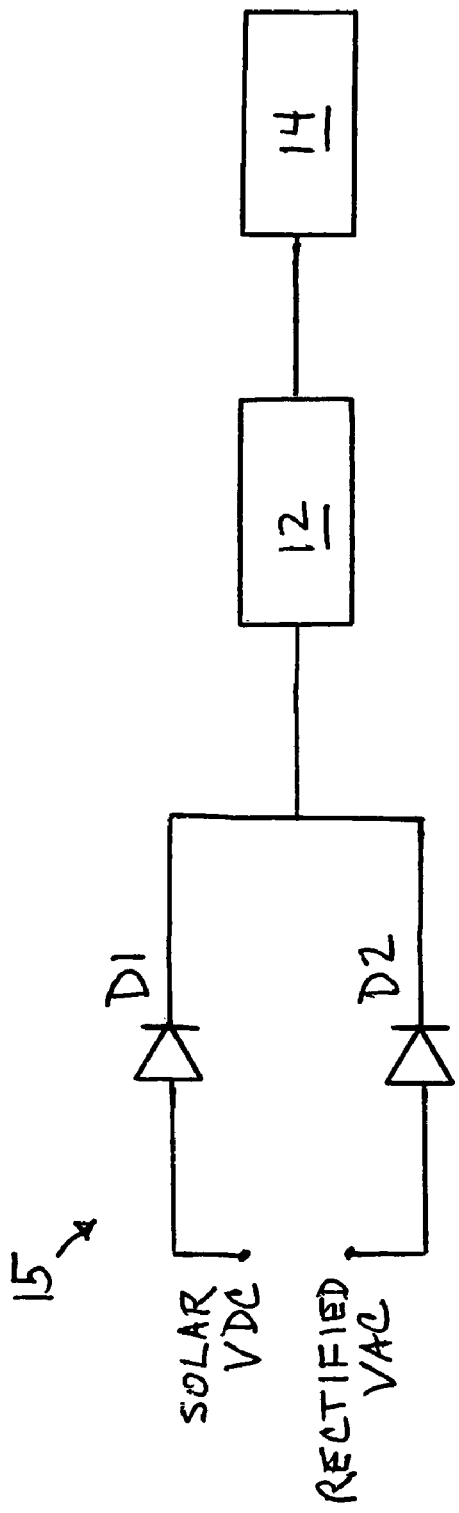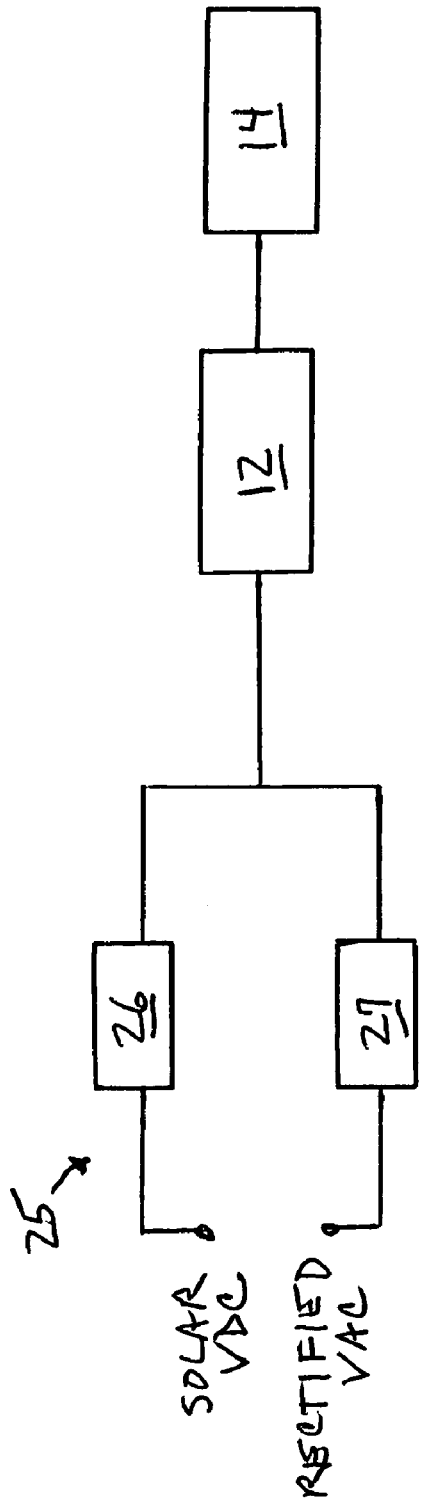
FIG.5
FIG.6

AC/DC HYBRID POWER SYSTEM

RELATED APPLICATIONS

This application claims priority of Provisional Application Ser. No. 60/424,678 filed Nov. 8, 2002 which is herein incorporated by reference.

BACKGROUND OF THE INVENTION

Solar power has been used for electric generation in countries where an AC grid power was not available. With the changes occurring in power generation, the cost of electricity, and energy rebates, solar power becomes more attractive, even in developed countries with AC grid power. However, solar power is dependent on sun conditions and is therefore a variable power source. It is not available at nighttime or on cloudy days.

Accordingly, a hybrid system that uses solar power in conjunction with an AC power grid would be very useful. By combining AC grid power with solar power, the useful operating hours of the system can be extended beyond the normal operation of the solar power component while the use of the AC grid power component can be minimized.

SUMMARY OF THE INVENTION

The invention is a hybrid solar—AC grid (or other) power system. A DC solar power source is the primary power source. A rectified AC voltage from an AC power grid (or other source) provides a secondary DC power source. These two DC sources—solar and rectifier AC grid (or other)—are combined through blocking diodes or other selection components to the DC input terminals of a variable speed drive. Either or both voltage sources can be selected, depending on the magnitude of the voltage from each source. The variable speed drive uses the DC input voltage to produce a single phase or 3-phase voltage to a motor or other load.

BRIEF DESCRIPTION OF THE DRAWINGS

FIG. 1 is a schematic diagram of a hybrid system of the invention having two DC power sources connected through blocking diodes.

FIG. 2 is a schematic diagram of a hybrid system of the invention having a DC and a single phase AC power source connected through blocking diodes.

FIG. 3 is a schematic diagram of a hybrid system of the invention having a DC and a 3-phase AC power source connected through blocking diodes.

FIG. 4 is a schematic diagram of a hybrid system of the invention having a DC power source and a 3-phase AC power source with SCR bridge connected through blocking diodes.

FIG. 5 is a schematic diagram of a hybrid system of the invention having a solar DC power source and a rectified AC power source connected through blocking diodes.

FIG. 6 is a schematic diagram of a hybrid system of the invention having a solar DC source and a rectified AC source connected through relays.

DETAILED DESCRIPTION OF THE INVENTION

In the hybrid power system of the invention, a DC solar power source is chosen to be the primary source and rectified AC from an AC grid is the backup power source. The two power sources are selectably coupled together through blocking diodes or relays or other selection components to a variable speed drive so that a sufficient voltage is always provided to a load, e.g. motor. When the solar power source produces a sufficient voltage for the load, it provides the power to the load. When the solar power source provides an insufficient voltage, then the backup power source is selected to power the load. Thus the load always receives sufficient power and the AC grid is only used when the solar power source is insufficient.

A minimum solar voltage level is chosen such that below this level, solar is not effective to drive the load, causing the load (e.g. motor) to go into shutdown or possibly stalling. By selecting the AC rectified voltage and controlling its peak voltage (VACpeak) to be equal to or slightly greater than the minimum solar voltage, uninterrupted power control can be provided to the variable speed drive. During cloudy days, or late evening or nighttime, the backup rectified AC source becomes the primary source and will supply power. During sunny daytime hours, solar becomes the primary source. The switching between solar and rectified AC power is transparent since both sources are available at all times (to the extent that the solar system is producing any power). The switching between the two power supplies is controlled through selection components, typically blocking diodes or SCRs or relays, which pass one supply and block the other supply depending on the voltages produced by each supply. One selection component will be forward biased or on while the other will be reverse biased or off. FIG. 6 shows a hybrid system 25, generally as described below, where one source is a solar DC source (SOLAR VDC) and the other source is a rectified AC source (RECTIFIED VAC) connected through relays 26, 27.

If an AC motor is being operated with rectified AC power as the primary source, solar can be used in combination with the AC grid power even if the solar power is not adequate to power the motor by itself. A variable speed drive, which produces either a variable frequency or fixed frequency output, is used to drive the motor. The DC input voltage to the drive is set at a predetermined voltage level that permits the sharing of power between the two sources. When the solar voltage drops below this predetermined value, the rectified AC source becomes the primary source. When solar power is equal to the predetermined value, both sources are supplying power. Again, the switching is automatic and transparent to the variable speed drive when combined with blocking diodes. Thus the solar source supplements the AC grid as much as possible and reduces use of grid power.

A simple hybrid power system 10 of the invention, as shown in FIG. 1, has a pair of DC sources V1, V2 connected through respective blocking diodes D1, D2 to the DC input of a variable frequency drive 12 whose output is connected to a load 14. Load 14 is typically a motor and drive 12 produces a single phase or 3-phase variable frequency or fixed frequency AC output to drive load 14. The voltages V1, V2 may be variable, e.g. V2 may be a solar power source such as a photovoltaic panel whose output changes with changing sun conditions. The power requirements of load 14 may also change. By connecting the two voltage sources V1, V2 to drive 12 through blocking diodes D1, D2, the higher voltage source will always be connected to drive 12. When V1>V2, D1 is forward biased while D2 is back biased so V1 is the primary source. When V2>V1, D2 is forward biased while D1 is back biased so V2 is the primary source. Thus if V2 is a solar panel, and V1 is another DC source, e.g. battery or rectified AC voltage, power is obtained from the solar panel when V2>V1; otherwise power will be obtained from the other source. If there are temporary fluctuations when V2 drops below V1, then V1 automatically switches in and the load does not see any change in power. FIG. 5 shows a hybrid system 15 where one source is a solar DC source (SOLAR VDC) and the other source is a rectified AC source (RECTIFIED VAC) connected through blocking diodes D1, D2.

Another simple hybrid power system 20 of the invention, as shown in FIG. 2, has a DC source VDC and a single phase AC source VAC connected through respective blocking diodes D2, D1 to the DC input of a variable frequency drive 12 whose output is connected to a load 14. The voltages VDC, VAC may be variable, e.g. VDC may be a solar power source such as a photovoltaic panel whose output changes with changing sun conditions. By connecting the two voltage sources VAC, VDC to drive 12 through blocking diodes D1, D2, the higher voltage source will always be connected to drive 12. When VACpeak>VDC, D1 is forward biased while D2 is back biased so VAC is the primary source. When VDC>VACpeak, D2 is forward biased while D1 is back biased so VDC is the primary source. Thus if VDC is a solar panel, and VAC is an AC grid, the solar source VDC will power the load when it produces sufficient voltage; otherwise power will be obtained from the other source. If there are temporary fluctuations when VDC drops below VACpeak, then VAC automatically switches in and the load does not see any change in power.

Another simple hybrid power system 30 of the invention, as shown in FIG. 3, has a DC source VDC and a 3-phase AC source having three windings L1, L2, L3 connected through respective blocking diodes D2, and D1-1, D1-2, D1-3 to the DC input of a variable frequency drive 12 whose output is connected to a load 14. The system 30 is similar to system 20. When Vpeak of L1, L2, L3 is greater than VDC, the 3-phase AC supply is the primary supply; otherwise, VDC is the primary supply.

Hybrid power system 40, shown in FIG. 4, is similar to system 30 but the three blocking diodes D1-1, D1-2, D1-3 connected to the windings L1, L2, L3 of the 3-phase AC source are replaced by silicon controlled rectifiers SCR-1, SCR-2, SCR-3. This allows for variable DC voltage to be applied to the variable frequency motor drive.

The invention claimed is:

1. A hybrid power system for providing power to a load, comprising:
    a solar DC power source;
    a rectified AC power source; and
    first and second selection components connected respectively to the outputs of the solar DC power source and rectified AC power source and having their outputs connected to a common node;
    wherein, the first and second selection components select either or both power sources to apply power to the common node depending on the magnitude of the voltage from each source;
    wherein a minimum solar voltage level is chosen such that below that level solar power is not sufficient to drive the load; and
    wherein the peak rectified AC voltage is selected and controlled to be equal to or slightly greater than the selected minimum solar voltage;
    so that when the solar voltage is equal to or greater than the selected minimum, the load is driven by the solar DC power source, and when the solar voltage is less than the selected minimum, the load is driven by the rectified AC power source.

2. The system if claim 1 wherein the solar DC power source is a photovoltaic panel.

3. The system of claim 1 wherein the rectified AC power source is obtained from an AC power grid.

4. The system of claim 1 wherein the rectified AC power source is a 3-phase AC source having three windings and the second selection component has three elements, one connected to each winding.

5. The system of claim 1 wherein the first and second selection components are blocking diodes.

6. The system of claim 1 wherein the first and second selection components are silicon controlled rectifiers (SCRs).

7. The system of claim 1 wherein the first and second selection components are relays.

8. The system of claim 1 further comprising a variable speed drive having its input connected to the common node.

9. The system of claim 8 further comprising a load connected to the output of the variable speed drive.

10. The system of claim 9 wherein the load is a motor.

11. A hybrid power system for providing power to a load, comprising:
    a solar DC power source;
    a rectified AC power source; and
    first and second blocking diodes connected respectively to the outputs of the solar DC power source and rectified AC power source and having their outputs connected to a common node;
    wherein the first and second blocking diodes pass one power source and block the other power source to apply power to the common node depending on the magnitude of the voltage from each source;
    wherein a minimum solar voltage level is chosen such that below that level solar power is not sufficient to drive the load; and
    wherein the peak rectified AC voltage is selected and controlled to be equal to or slightly greater than the selected minimum solar voltage;
    so that when the solar voltage is equal to or greater than the selected minimum, the first and second blocking diodes pass the solar DC power source and block the rectified AC power source and the load is driven by the solar DC power source, and when the solar voltage is less than the selected minimum, the first and second blocking diodes block the solar DC power source and pass the rectified AC power source and the load is driven by the rectified AC power source.

12. The system if claim 11 wherein the solar DC power source is a photovoltaic panel and the rectified AC power source is obtained from an AC power grid.

13. The system of claim 11 wherein the rectified AC power source is a 3-phase AC source having three windings and the second blocking diodes comprise three diodes, one connected to each winding.

14. The system of claim 11 further comprising a variable speed drive having its input connected to the common node.

15. The system of claim 14 further comprising a load connected to the output of the variable speed drive.

16. The system of claim 15 wherein the load is a motor.

* * * * *